US012635705B2

(12) United States Patent
Morend et al.

(10) Patent No.: US 12,635,705 B2
(45) Date of Patent: May 26, 2026

(54) METHOD TO ROAST COFFEE BEANS

(71) Applicant: SOCIETE DES PRODUITS NESTLE S.A., Vevey (CH)

(72) Inventors: Joel Morend, Chatonnaye (CH); Flavien Florent Dubief, Champagne (CH); Thomas Rudi S. Degreef, Grimbergen (BE); Michiel Alexander Celis, Deurne (BE); Rien Denise M. Lemmens, Boechout Antwerp (BE); Maxime Baekelandt, Ghent (BE)

(73) Assignee: Société des Produits Nestlé S.A., Vevey (CH)

( * ) Notice: Subject to any disclaimer, the term of this patent is extended or adjusted under 35 U.S.C. 154(b) by 489 days.

(21) Appl. No.: 18/248,396

(22) PCT Filed: Oct. 18, 2021

(86) PCT No.: PCT/EP2021/078827
§ 371 (c)(1),
(2) Date: Apr. 10, 2023

(87) PCT Pub. No.: WO2022/084258
PCT Pub. Date: Apr. 28, 2022

(65) Prior Publication Data
US 2023/0371541 A1 Nov. 23, 2023

(30) Foreign Application Priority Data
Oct. 20, 2020 (EP) ..................................... 20202829

(51) Int. Cl.
*A23F 5/04* (2006.01)
*A23N 12/12* (2006.01)
(Continued)

(52) U.S. Cl.
CPC .............. *A23F 5/04* (2013.01); *A23N 12/125* (2013.01); *B01D 46/0086* (2013.01);
(Continued)

(58) Field of Classification Search
CPC ................ A23F 5/04–06; A23N 12/12; A23N 12/08–125; G06N 20/00; A23V 2300/24;
(Continued)

(56) References Cited

U.S. PATENT DOCUMENTS 7,285,300 B1 10/2007 Allington et al.
2005/0247194 A1* 11/2005 Kang ................... B01D 46/444
95/25
(Continued)

FOREIGN PATENT DOCUMENTS

CN 103984276 8/2014
CN 104801096 7/2015
(Continued)

*Primary Examiner* — Drew E Becker
(74) *Attorney, Agent, or Firm* — Thorpe North & Western, LLP

(57) ABSTRACT

The invention concerns a method to roast coffee beans in a roasting system (10), said system comprising: —a roasting apparatus (2), and —a smoke treating unit (3) configured to treat the smoke produced by the roasting apparatus, said smoke treating unit comprising at least one filtering device (221, 222, 223) configured for filtering particulate matters or VOCs, said filtering device being able to retain a predetermined maximal amount of particulate matters or VOCs, wherein at each roasting operation implemented in the roasting apparatus, the method comprises the steps of: —obtaining the quantity of beans and the level of roasting applied to the beans, —determining the amount of or VOCs retained in the filtering device, —determining the global amount of particular matters or VOCs retained in the filtering device during all the roasting operations implemented since the last cleaning operation of the filtering device, (Continued)

—estimating the number of roasting operations still able to be implemented before said global amount is equal to the pre-determined maximal amount of particulate matters or VOCs able to be retained by the filtering device.

14 Claims, 3 Drawing Sheets

(51) Int. Cl.
  *B01D 46/00* (2022.01)
  *B01D 46/44* (2006.01)
  *B01D 46/46* (2006.01)

(52) U.S. Cl.
  CPC ........... *B01D 46/442* (2013.01); *B01D 46/46* (2013.01); *B01D 2201/54* (2013.01); *B01D 2257/708* (2013.01); *B01D 2258/0275* (2013.01)

(58) Field of Classification Search
  CPC ..... A47J 31/42; B01D 35/02; B01D 46/0086; B01D 46/442; B01D 46/46; B01D 2201/54; B01D 2257/708; B01D 2258/0275; B01D 2321/40
  See application file for complete search history.

(56) References Cited

U.S. PATENT DOCUMENTS

| | | | | |
|---|---|---|---|---|
| 2007/0157819 | A1* | 7/2007 | Kang ..................... | B01D 46/46 96/417 |
| 2009/0238929 | A1 | 9/2009 | Freedman | |
| 2016/0116392 | A1* | 4/2016 | Carpenter ........... | B01D 35/143 702/34 |
| 2017/0319002 | A1* | 11/2017 | Tan ............................ | A23F 5/04 |
| 2017/0361259 | A1* | 12/2017 | Fox .......................... | F24F 11/00 |
| 2018/0353891 | A1* | 12/2018 | Cho ....................... | B01D 46/46 |
| 2020/0139276 | A1 | 5/2020 | Wetherill et al. | |
| 2020/0179857 | A1* | 6/2020 | Delin ...................... | F24F 8/108 |
| 2021/0060474 | A1* | 3/2021 | Caesar .................. | F01D 21/003 |
| 2021/0123850 | A1* | 4/2021 | Caesar .................. | G06N 20/00 |
| 2021/0180532 | A1* | 6/2021 | Sen ...................... | B01D 29/606 |
| 2021/0236979 | A1* | 8/2021 | Pham ........................ | F24F 11/64 |
| 2022/0113718 | A1* | 4/2022 | Chang ............... | G05B 23/0283 |
| 2022/0327869 | A1* | 10/2022 | Hukill ............... | B01D 46/0086 |
| 2024/0000126 | A1* | 1/2024 | Morend ............ | B01D 53/0407 |
| 2024/0019150 | A1* | 1/2024 | Hsu .......................... | F24F 11/39 |
| 2024/0180226 | A1* | 6/2024 | Dubief .................. | A23N 12/08 |

FOREIGN PATENT DOCUMENTS

| | | |
|---|---|---|
| CN | 104819545 | 8/2015 |
| CN | 106998947 | 8/2017 |
| CN | 108139099 | 6/2018 |
| CN | 109195684 | 1/2019 |
| DE | 10036270 | 3/2001 |
| JP | 2017042083 A | 3/2017 |
| JP | 2018505780 A | 3/2018 |
| RU | 2653762 C1 | 5/2018 |
| SU | 119792 A1 | 11/1958 |
| WO | 9923888 | 5/1999 |
| WO | 2016063177 A1 | 4/2016 |
| WO | 2020084134 | 4/2020 |
| WO | 2020127360 | 6/2020 |

* cited by examiner

METHOD TO ROAST COFFEE BEANS

CROSS REFERENCE TO RELATED APPLICATIONS

The present application is a National Stage of International Application No. PCT/EP2021/078827, filed on Oct. 18, 2021, which claims priority to European Patent Application No. 20202829.6, filed on Oct. 20, 2020, the entire contents of which are being incorporated herein by reference.

FIELD OF THE INVENTION

The present invention relates to relates to apparatuses for roasting coffee beans in a safe environment.

BACKGROUND OF THE INVENTION

The roasting of coffee beans is a well-known process. The main steps consist in heating the beans to a desired roasting level and then cooling or quenching the heated beans to stop the roasting. During heating, smoke is emitted. This smoke contains safe and desired components all together, in particular the usual roasted coffee aroma, but also undesired less safe volatile organic compounds (VOC) VOC such as pyridine, 2-furane methanol, caffeine furfural, formaldehyde, acetaldehyde, . . . and particulate matter (PM2.5, PM10), . . . . When roasting is implemented in manufacturing places producing important quantities of roasted beans, generally all the conditions for catching unsafe components are supplied.

But, there is a recent trend to implement small batch roasting with small roasters in shops, restaurants, coffees and at home where customers are able to consume coffee brewed from freshly roasted beans. The roaster does not only provide freshness and theater advantages, but also dispenses the pleasant roasted coffee aroma inside the shop or coffee.

Yet, as mentioned above, harmful components are emitted too. When the roaster is used in a closed environment like a shop, coffee or restaurant, the emission of some components can become harmful depending on the size of the room, the ventilation of the room, . . . . For people working several hours in the room, smelling the smokes of the roaster can lead to a health problem.

As a result, in such an environment, it is recommended to reduce the emission of smoke from the roaster to avoid any healthy issue for people present in the shop. The existing solutions consist in destroying contaminants, such as an afterburner enabling thermal oxidation of contaminants or a catalytic afterburner or retaining contaminants inside the apparatus like mechanical filters (metallic sieves or paper filter), an active carbon filter or an electrostatic precipitator or combination thereof.

An active carbon filter traps VOCs until a certain maximal amount is reached. When this amount is reached, this filter does not retain VOCs any longer and the active carbon filter must be replaced by a new one. This replacement implies costs and anticipation for the operator, who must have ordered and stored a new active carbon filter.

An electrostatic precipitator catches some PM. The advantages of an electrostatic precipitator is its low cost of use, the absence of noise or heat generated during its use. Since, the electrostatic precipitator traps the contaminants that remain attached to the electrified cell of the electrostatic precipitator, the apparatus must be regularly cleaned. The cleaning operation consists in removing the cells of the electrostatic precipitator from the filter device and washing then with water and optionally with a detergent. Then the cells need to dry before being reinstalled inside the filter unit.

Other filters are used for trapping the biggest particulate matters like high metal-mesh or metallic filters (for example ultrafine steel wool media filter) and efficiency particulate accumulator (HEPA) filters. These filters require cleaning too and even more frequently than the electrostatic precipitator since they are the first devices to filter the smoke emitted by the roaster; they retain the biggest particles and are rapidly clogged.

Finally, the upstream part of the duct conducting the smoke from the roaster to the filtering unit and the different filtering devices of the smoke treating unit requires cleaning too because greasy deposits stick to the internal walls.

With the recent trend to use small roasters in shops, restaurants and coffees, roasting operations happen frequently during the opening hours and the need for cleaning the smoke filter device can happen urgently during the opening hours. In that case, the length of the cleaning becomes incompatible with the high rate of use of the roaster and the filter device. An alert for cleaning can be set based on the maximal number of hours during which the roaster was operated or based on a maximal quantity of coffee beans that were roasted. But this alert is not fully accurate and may force the operator to clean the filer unit although it is not yet necessary, with the disadvantage of cleaning too frequently or changing some disposable filtering elements like the active carbons that are still efficient, which increases the costs of operation of the roaster. Or, on the contrary, the alert may force the operator to clean the filter too late with the result of a lack of efficiency in filtering during the last roasting operations and not guaranteeing a safe environment for people around the roaster.

An object of the invention is to address the above existing problems.

In particular an object of the invention is to address the problem of informing the operator of the moment where it becomes necessary to clean the filtering unit in an accurate manner.

It would be advantageous to provide a method to enable the roasting operator to be informed of the moment of cleaning in a preventive manner so that he/she is able to schedule the moment of cleaning while avoiding unnecessary cleaning operation at a too early stage or cleaning operation at a too late stage.

SUMMARY OF THE INVENTION

In a first aspect of the invention, there is provided a method to roast coffee beans in a roasting system, said system comprising:

a roasting apparatus, and a smoke treating unit configured to treat the smoke produced by the roasting apparatus, said smoke treating unit comprising at least one filtering device configured for filtering particulate matters or VOCs, said filtering device being able to retain a pre-determined maximal amount of particulate matters or VOCs, wherein at each roasting operation implemented in the roasting apparatus, the method comprises the steps of:

obtaining directly or indirectly the quantity of beans roasted during said roasting operation and the level of roasting applied to the beans during said roasting operation determining the amount of particular matters or VOCs retained in said filtering device during said roasting operation based on said obtained quantity of beans roasted and on said obtained level of roasting, determining the global amount of PM or VOCs retained in said filtering device during all the roasting operations implemented since the last cleaning operation of the filtering device, estimating the number of roasting operations still able to be implemented before said global amount is equal to the pre-determined maximal amount of particulate matters or VOCs able to be retained by the filtering device.

The method relates to the roasting of coffee beans by means of a system comprises two apparatuses: first, the roasting apparatus in which beans are heated to be roasted and, secondly, the smoke treating unit configured to treat the smoke generated inside the first roasting apparatus during the roasting of the coffee beans.

The two apparatuses can be sub-parts of one single main system or alternatively, the two apparatuses can be conceived as separated modules cooperating together during the process of roasting.

Any type of roasting apparatus can be used. In the roasting apparatus, coffee beans are heated and preferably mixed to homogenise heating through the beans.

The source of heating can be a burner (meaning combustion) fed by natural gas, liquefied petroleum gas (LPG) or even wood. Alternatively the heat source can be an electrical resistor, a ceramic heater, a halogen source, a source of infrared or of microwaves.

Preferably the source of heating is electrically powered so that the air contaminants produced during the roasting are contaminants generated from the heating of coffee beans themselves only and not from the burning of gases as it happens when the source of heating is a gas burner using natural gas, propane, liquefied petroleum gas (LPG) or even wood.

The mixing of the beans during the roasting operation can be obtained with a fluidic bed of hot air or mechanically with stirring blades or a rotating drum.

Preferably the roasting apparatus is hot air fluid bed chamber. Within such a chamber, heated air is forced through a screen or a perforated plate under the coffee beans with sufficient force to lift the beans. Heat is transferred to the beans as they tumble and circulate within this fluidized bed.

Alternatively, the roasting apparatus can be a drum chamber wherein the coffee beans are tumbled in a heated environment. The drum chamber can consist of a drum rotating along a horizontal axis or the drum chamber can comprise stirring blades to tumble the coffee beans in a heated environment.

The roasting apparatus comprises an outlet from which smoke produced during the roasting operation can be evacuated.

Generally, the smoke treating unit of the system comprises a smoke inlet configured to cooperate with this smoke outlet of the roasting apparatus and to collect smoke through this smoke inlet.

The smoke treating unit of the system comprises at least one smoke filtering device. This device treats the smoke in order to reduce or eliminate harmful contaminants the smoke contains.

The smoke treating unit can comprise at least one filtering device configured for filtering particulate matters or PM, volatile organic compounds or VOCs and/or hydrocarbons.

Preferably, the smoke treating unit comprises at least one filtering device in the list of: a high efficiency particulate accumulator filter, a metallic filter, an electrostatic precipitator, an active carbon filter, paper filter, cotton, cloth. Optionally, the smoke treating unit can comprise additional filtering devices like wet-scrubbers, catalytic converters, afterburners.

Filters configured for trapping VOCs are preferably active carbon filter or charcoal filter.

Filters configured for trapping large particulate matters presenting size above 2.5 μm, usually between 2.5 μm and 10 μm, are preferably:

high efficiency particulate accumulator (HEPA) filters. They can filter white plume smoke and small particles.

metallic filters, for example ultrafine steel wool media filter or a metal mesh. They can remove chaff fines and trap particles bigger than 10 μm.

Electrostatic precipitators can be used to trap particles presenting size comprised between 1.0 and 10 μm.

Preferably the smoke treating unit comprises several filters depending on their ability to retain specific contaminants.

Preferably, the smoke filtering sub-unit comprises successively, according to the direction of the flow of the smoke inside the smoke treating unit, at least one filter to remove particulate matters and then an active carbon filter. This order prevents the active carbon filter from being clogged by particulate matters.

Preferably, if an electrostatic precipitator is implemented, it is positioned physically upstream the active carbon filter.

The smoke is driven inside the smoke treating unit and the different filters by means of a smoke driver configured to circulate smoke through the smoke treating unit from the inlet to the outlet of the smoke treating unit. At the outlet, the treated flow can be safely released inside the atmosphere of a room since the smoke and the contaminants have been trapped. The smoke driver is generally a fan driving the smoke to the outlet.

Preferably the fan is positioned next to the outlet of the smoke treating unit. As a result, the fan is not contaminated by the non-treated smoke and its maintenance is easier.

According to one preferred embodiment, the smoke filtering sub-unit comprises at least successively:

a metallic mesh, then an electrostatic precipitator, and then an active carbon filter according to the movement of the flow of the smoke inside the smoke treating unit.

Preferably within this embodiment, the active carbon filter is positioned physically above the electrostatic precipitator. Accordingly, the smoke is introduced upwardly through the successive devices.

Generally, the filtering device is able to retain a pre-determined maximal amount of particulate matters or VOCs before losing efficiency and requiring cleaning or replacement.

The filtering device is a passive treating unit that retains contaminants inside the device. It is the case for mechanical filters (metallic sieves or paper filter), an active carbon filter or an electrostatic precipitator. Consequently, at each roasting operation, the deposit of particulate matters or VOCs builds up inside the filtering device to a level where the efficiency of the filtering device decreases or even where the particulate matters or VOCs are not retained at all. When this level is reached, the filtering device must be cleaned or changed.

Some filtering devices can be simply cleaned before being used again. Metallic filters and metallic plates of ESP can be removed from the smoke treating unit, washed and then reintroduced inside the smoke treating unit.

Some other filtering devices must be replaced by new ones like paper filters, HEPA and active carbon or charcoal filters.

In the present method of roasting, at each roasting operation implemented in the roasting apparatus, the method comprises the steps of obtaining directly or indirectly the quantity of beans and the desired of level of roasting for the beans during said roasting operation, and determining the amount of particular matters or VOCs retained in said filtering device during said roasting operation based on the quantity of beans roasted during said roasting operation and based on the level of roasting applied to the beans during said roasting operation.

Since the quantity of beans and the level of roasting of the beans directly impact the amount of particular matters and VOCs produced during a roasting operation, determining the amount of particular matters and VOCs based on said criteria provides a reliable determination of the quantity of PM and VOCs retained in the filtering device during the corresponding roasting operation.

In addition, at each roasting operation implemented in the roasting apparatus, the method comprises the step of determining the global amount of PM or VOCs retained in the filtering device during all the roasting operations implemented since the last cleaning operation of the filtering device. Actually, since at each roasting operation, the amount of PM and VOCs retained in the filtering device is determined in a reliable manner, then it is possible to successively add these amounts to determine the global amount retained in the filtering device up to the last roasting operation in a reliable manner too.

Finally, at each roasting operation implemented in the roasting apparatus, the method comprises the step of estimating the number of roasting operations still able to be implemented before said global amount is equal to the pre-determined maximal amount of particulate matters or VOCs able to be retained by the filtering device that is before the filtering device loses efficiency and requires cleaning or replacement.

The step of determining the amount of PM or VOCs retained by the filtering device during one specific roasting operation and the final step of estimating the number of roasting operations still implementable are both the results from the knowledge of:

the pre-defined specific amount of PM or VOCs produced by a specific quantity of beans roasted to a specific level, and the pre-determined maximal amount of particulate matters or VOCs able to be retained by the filtering device before the filtering device loses efficiency and requires cleaning or replacement.

These specific amounts of PM or VOCs produced by a specific quantity of beans roasted to a specific level are usually pre-defined by experimental measures during roasting operation at different levels of roasting (light, medium, dark) for the same predefined quantity of beans. Actually, it has been observed that roasting at a dark level emits more emissions than roasting at a light level. As for quantity of beans, the quantity of emissions is proportional to the quantity of roasted beans.

In a particular embodiment, the amount of PM or VOCs retained in the filtering device during the roasting operation can be determined based on the type of beans too.

The type of coffee beans can relate to specific features such as:

the origin of the beans and/or the botanical variety of the beans (*Arabica, Robusta,* . . . ) or a particular pre-existing mixture or blend of different beans; the pre-existing mixture or blend can be defined by the selection of different specific beans and/or by the ratio of these different specific beans.

the level of pre-roasting of the beans. The coffee beans to be roasted can be green beans or can be partially pre-roasted beans that is beans having been obtained by heating green coffee beans and stopping said heating process before the end of the first crack. These partially pre-roasted beans can be pre-roasted at different levels with a direct impact on the subsequent final roasting operated in the roasting apparatus.

the moisture of the beans, the size of the beans.

The types of beans can refer explicitly to the nature of the beans like the origin, the botanical variety, the blend, the level of pre-roasting.

These specific amounts of PM or VOCs produced by a specific quantity of beans roasted to a specific level and optionally for a specific type of beans are usually pre-defined for roasting in the specific roasting apparatus in which the method is applied. Actually, it has been observed that in a roasting apparatus comprising a drum, the drum retains some particles while in a roasting apparatus comprising a fluid bed chamber, more particles were present in the smoke at the outlet of the chamber. Consequently, for the same beans in the same quantity and roasted to the same level, the amount of emitted PM is smaller with a roasting apparatus comprising a drum than in a roasting apparatus comprising a fluid bed chamber.

Since the specific amount of PM or VOCs produced by a specific quantity of beans roasted to a specific level is pre-defined, then this specific amount of PM or VOCs can be used to determine accurately the amount produced during the particular roasting operation and retained inside the filtering device.

This determination can be executed according to different modes:

it can be set that the filtering device retains 100% of the emitted PMs and/or VOCs it is configured to filter, or it can be evaluated that the filtering device retains only a certain percentage of the emitted PMs and/or VOCs it is configured to filter, for example 98%, and this percentage applied to the emitted amount is considered for the determination of the retained amount.

This determination can be defined by experimentation or by reference to the technical specification of the filtering device.

At each successive roasting operations, the determined amount is added to the global amount of PM or VOCs retained in said filtering device since the last cleaning operation providing an accurate global amount.

Finally, the number of roasting operations still able to be implemented before cleaning can be estimated.

Usually, this estimation is based on:

the knowledge of the pre-determined maximal amount of particulate matters or VOCs able to be retained by the filtering device, and a specific type of roasting operation, said type of roasting operation being defined by a specific quantity of beans roasted during said roasting operation and a specific level of roasting applied to the beans during said roasting operation.

As for the pre-determined maximal amount of particulate matters or VOCs able to be retained by the filtering device, this amount can be determined by previous experimentation on the filtering device.

For example, during experimentations, it was observed that, for an electrostatic precipitator, when the level of PMs trapped in the cells increases, electric breakdowns happen more and more frequently, which is the evidence that cleaning is necessary. These breakdowns are not desirable for the equipment. By experimentation and analysis of the occurrence of breakdowns, the maximal amount can be determined at a level of trapped PMs that does not yet create breakdowns.

For an active carbon filter, when the device cannot trap VOCs any longer, a strong smell happened. By experimentation and analysis of the appearance of this smell compared to the level of VOCs introduced in the filter, the maximal amount can be fixed before this smell appears.

Optionally these maximal amounts can be defined according to the specification of the filtering device provided by the manufacturer of this filtering device The estimation provides the number of roasting operations that can still be implemented if all future roasting operations are implemented with the conditions of the specific roasting that implements the features of this specific roasting operation, that is the specific quantity of beans and the specific level of roasting.

The specific type of roasting operation can be pre-set according to different scenarios of use of the roasting apparatus such as:

in a conservative scenario, it is supposed that further roasting operations will be roasting at the highest level (dark). Based on this principle, as further operations effectively are implemented, the method enables a new determination of the number of roasting operations at each operation and a more and more accurate determination of the number of roasting operations. The determined number of operations be higher than estimated if only roasting operations at light level are implemented in actual fact.

in an optimistic scenario, it is supposed that further roasting operations will be roasting at the lowest level (light). Based on this principle, as further operations effectively are implemented, the method enables a new determination of the number of roasting operations at each operation and a more and more accurate determination of the number of roasting operations. The determined number of operations can be lower than estimated if only roasting operations at dark level are implemented in actual fact.

in another scenario, it can be supposed that further roasting operations will be alternatively roasting at the lowest level (light) and roasting at the darkest level (dark).

in another scenario, it can be supposed that further roasting operations will be a mix of different precise roasting operations, for example 50% of the roasting operation at the dark level, 30% 50 of the roasting operation at the medium level and 20% at the light level. This mix of different precise roasting operations can correspond to the scheduled daily operations of the operator and programmed in the roasting apparatus.

In these scenarios, the specific quantity of beans of the specific roasting operation can correspond to the recommended optimal quantity of beans to be roasted in the particular roasting apparatus in which the method is implemented.

Alternatively, the specific type of roasting operation can be defined from the past roasting operations implemented within the roasting apparatus, preferentially through machine learning or through statistics. The definition can be based on a certain number of past roasting operations that have been implemented up to the last operation or on the operations that have been implemented since a certain period of time. An average of the quantity of beans and the level of roasting used during these past operations can be used to define the specific roasting operation on which the estimation is based.

The apparatus in which the method is implemented can be configured to enable the operator to select the type of scenario.

As more and more operations happen, this method provides an accurate evaluation of the need to clean the filtering device preventing too early cleaning or too late cleaning and enabling the operator to program the cleaning operation in view of the scheduled roasting operations.

The number of roasting operations can be presented under different aspects.

In one aspect, this number can provide the number of times a typical roasting operation can still be implemented. This typical roasting operation is pre-defined. For example, this typical roasting operation corresponds to the light roasting of a fixed quantity of beans. Based on the definition of this typical roasting operation, the operator is able to understand that the determined number of roasting can be less than determined if new roasting operations are implemented at higher levels or for a bigger quantity of beans per operation.

This typical roasting operation can be pre-defined according to the habits of the operator and set to the usual level of roasting and quantity of roasting used by the operator.

In another aspect, the number of roasting operations can provide the quantity of coffee that can still be roasted according to a typical roasting operation as explained above.

In one embodiment, the roasting apparatus can be configured to enable the input of the quantity of beans roasted during said roasting operation and/or the level of roasting applied to the beans during said roasting operation.

The input can be implemented in different manners.

The quantity of coffee beans introduced in the chamber can be obtained:

from the user. In that case, the apparatus can comprise a user interface to enable the user to enter the quantity of each type of beans she/he is introducing inside the chamber. This quantity can be entered through the interface of a mobile device configured to communicate with the control system of the roasting apparatus.

or from the selection of a particular roasting recipe by the user, the recipe determining a quantity of beans.

or from a measuring device connected to the control system of the roasting apparatus. In that case, the measure of the quantity of the beans can be automatically provided to the control system of the apparatus.

In those cases, the quantity is obtained directly.

In one particular embodiment, the roasting apparatus can be configured to always roast the same pre-determined quantity of coffee beans. In that case, this pre-determined quantity of beans can be stored in the memory of the control system or can be set in the instructions of the computer program executed by the control system. In that case, the quantity is obtained indirectly.

The type of beans $C_n$ can be obtained by different ways:

from the user. In that case, the user interface of the apparatus can display a list of types of beans and urge the user to select the types she/he is introducing inside the chamber. Alternatively, this list can be displayed through the interface of a mobile device configured to communicate with the control system of the apparatus.

or from a code, such as a code provided on a beans package. In that case, the apparatus can comprise a code reader and the control system can be configured to urge the operator to scan the code of the beans (for example provided on the beans package) she/he is introducing inside the chamber.

Preferably, the roasting apparatus comprises a user interface configured to enable the operator to provide the quantity and/or the level of roasting either directly or indirectly.

In this embodiment, obtaining the quantity and the level, optionally the type of beans, provides access to the pre-determined amount of PM or VOCs retained in the filtering device for said obtained quantity and said obtained level.

The pre-determined amount of PM or VOCs can be stored in a database or memory accessible to the control system of the system In another embodiment, the smoke treating unit can comprise a particulate matter sensor or a VOCs sensor positioned downstream the roasting apparatus, and at each roasting operation implemented in the roasting apparatus, the quantity of beans roasted during said roasting operation and the level of roasting applied to the beans during said roasting operation are obtained from the quantity of particulate matter or VOCs measured by the sensor downstream the filtering device.

In this particular embodiment, the method does not need to rely only on the input of the quantity and the level of roasted beans used and applied in the roasting operation. These pieces of information can be fully deduced or confirmed from the measure of PMs or VOCs downstream the roasting apparatus.

It is possible to position a particulate matter sensor and/or a VOCs sensor at the outlet of the roasting apparatus or at the inlet of the smoke treating unit. Since the specific amount of PM or VOCs produced by a specific quantity of beans roasted to a specific level is pre-defined, then the measure of PMs or VOCs directly emitted by roasting apparatus provides or confirms the quantity and the level of roasted beans Preferably, the particulate matter sensor and/or the VOCs sensor is/are positioned downstream one filtering device.

This deduction is based on the known filtering capacity of the filtering device. Since usually a filtering device does not retain completely PMs or VOCs, the value of the measured PMs or VOCs downstream the filtering device is proportional to the value of PMs or VOCs treated by the filtering device. Accordingly, it is possible to determine the quantity and the roasting level of beans that are being roasted based on the measured PMs or VOCs. Generally, the correspondence between the value of the measured PMs or VOCs downstream one particular filtering device with the roasted quantity of beans and the level of roasting is determined by experimentation.

This embodiment provides different advantages:

if the control system of the roasting unit does not communicate with the control system of the smoke treating unit, then information about the weight and the level of roasting may not be obtained by the control system of the smoke treating unit.

if the operator does a mistake when supplying the quantity, the level of roasting or the type of beans, the sensor enables the determination of a discrepancy with the information inputted by the operator. Then the values of the sensor can be taken into account to determine the real quantity of PM or VOCs and the determined global amount of PM or VOCs remains accurate.

if there is technical issue with the roasting apparatus or the filtering device, with abnormal high emissions that do not correspond to usual roasting operations, an alert can be displayed.

if the smoke treating unit comprises more than one filtering devices and more than one sensors, each dedicated to one filtering device, the coherency of the measures at the different sensors can be controlled and provide information about the origin of a potential problem.

if the operator defines the recipe on its own (expert mode or type of beans unknown) and the level of emitted components is unknown.

to obtain the weight and the level of roasting from two sources (from the input at the roasting apparatus and from the measure at the sensors) in order to avoid any missing information and be able to accurately identify each implemented roasting operation.

Preferably, the smoke treating unit can comprise:

an electrostatic precipitator and a sensor for particulate matters, said particulate matter sensor being positioned downstream said electrostatic precipitator, and/or an active carbon filter and a sensor for VOCs, said VOCs sensor being positioned just downstream said active carbon filter.

Any type of sensor can be used.

The sensor for VOCs can be a resistive sensor providing a signal that decreases when the level of VOCs increases, for example the gas sensor BME680 commercialised by Bosch.

In one particular embodiment, at each roasting operation implemented in the roasting apparatus, the quantity of beans roasted during said roasting operation and the level of roasting applied to the beans during said roasting operation are obtained simultaneously:

from the quantity of particulate matter or VOCs measured by the sensor downstream the roasting apparatus, and from the input of the quantity of beans roasted during said roasting operation and/or the level of roasting applied to the beans during said roasting operation.

This embodiment provides the advantage of always enabling the obtention of the quantity of beans and level of roasting for each roasting operation even if the sensors are misfunctioning. Accordingly, the estimation remain accurate.

Preferably, the smoke treating unit can comprise several filtering devices and the method can be applied for each filtering device of the smoke treating unit.

As each filtering device retains different types of PMs or VOCs and the roasting operation emits different quantities of PMs and VOCs, the number of roasting operations still able to be implemented for one filtering device can differ from the number of operations for other filtering device.

Preferably, the roasting apparatus can comprise a display unit and the method comprises the step of displaying the determined number of roasting operations still able to be implemented before the global amount is equal to the maximal amount of particulate matters or VOCs able to be retained by the filtering device.

If the smoke treating unit comprises several filtering devices, then the specific number of operations still able to be implemented for each filtering device is displayed.

In one embodiment, the method can comprise the step of suggesting the quantity of beans and the level of roasting applied to said beans for future roasting operations.

Based on the estimated number of roasting operations based at least on a specific type of roasting operation, said type of roasting operation being defined by a specific quantity of beans roasted during said roasting operation and a specific level of roasting applied to the beans during said roasting operation, the estimated number can be increased if the operator roasts beans in conditions emitting less PMs and/or VOCs than the conditions defined in the specific type of roasting operation.

Preferably, the smoke treating unit comprises a cleanable smoke collecting device configured to collect smoke from the outlet of the roasting apparatus, and at each roasting operation implemented in the roasting apparatus, the method comprises the steps of:

determining the amount of residues trapped in said smoke collecting device during said roasting operation based on said obtained quantity of beans roasted and on said obtained level of roasting, determining the global amount of residues trapped in said smoke collecting device during all the roasting operations implemented since the last cleaning operation of the smoke collecting device, estimating the number of roasting operations still able to be implemented before said global amount is equal to the maximal amount of residues able to be deposited in the smoke collecting device.

The amount of residues trapped in the smoke collecting device during the roasting operation of a specific quantity of beans roasted to a specific level is pre-determined by previous experimentations.

In a second aspect, there is provided a system for roasting coffee beans, said system comprising:

a roasting apparatus, and a smoke treating unit configured to treat the smoke produced by the roasting apparatus, said smoke treating unit comprising at least one filtering device configured for filtering particulate matters or VOCs, said filtering device being able to filter a maximal amount of particulate matters or VOCs before being cleaned, a control system operable to control the roasting process according to the method such as described above.

In a third aspect, there is provided a computer program comprising instructions which, when executed by a computer, processor or control unit, cause the computer, processor or control unit to perform the method to roast such as described above.

In one embodiment, the computer program can be executed by the processing unit of the roasting apparatus and by the processing unit of the smoke treating unit, both processing units communicating together. In particular, the processing unit of the rosting apparatus can communicate the level of roasting and the quantity of roasted beans and the processing unit of the smoke treating unit can communicate the global amount of particular matters or VOCs retained in the filtering device during all the roasting operations implemented since the last cleaning operation of the filtering device.

In a fourth aspect, there is provided computer readable storage medium comprising instructions which, when executed by a computer, processor or control unit cause the computer, processor or control unit to carry out the method to roast such as described above.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

Specific embodiments of the invention are now described further, by way of example, with reference to the following drawings in which.

DETAILED DESCRIPTION OF EXEMPLARY EMBODIMENTS

System for Roasting

Figure 1:
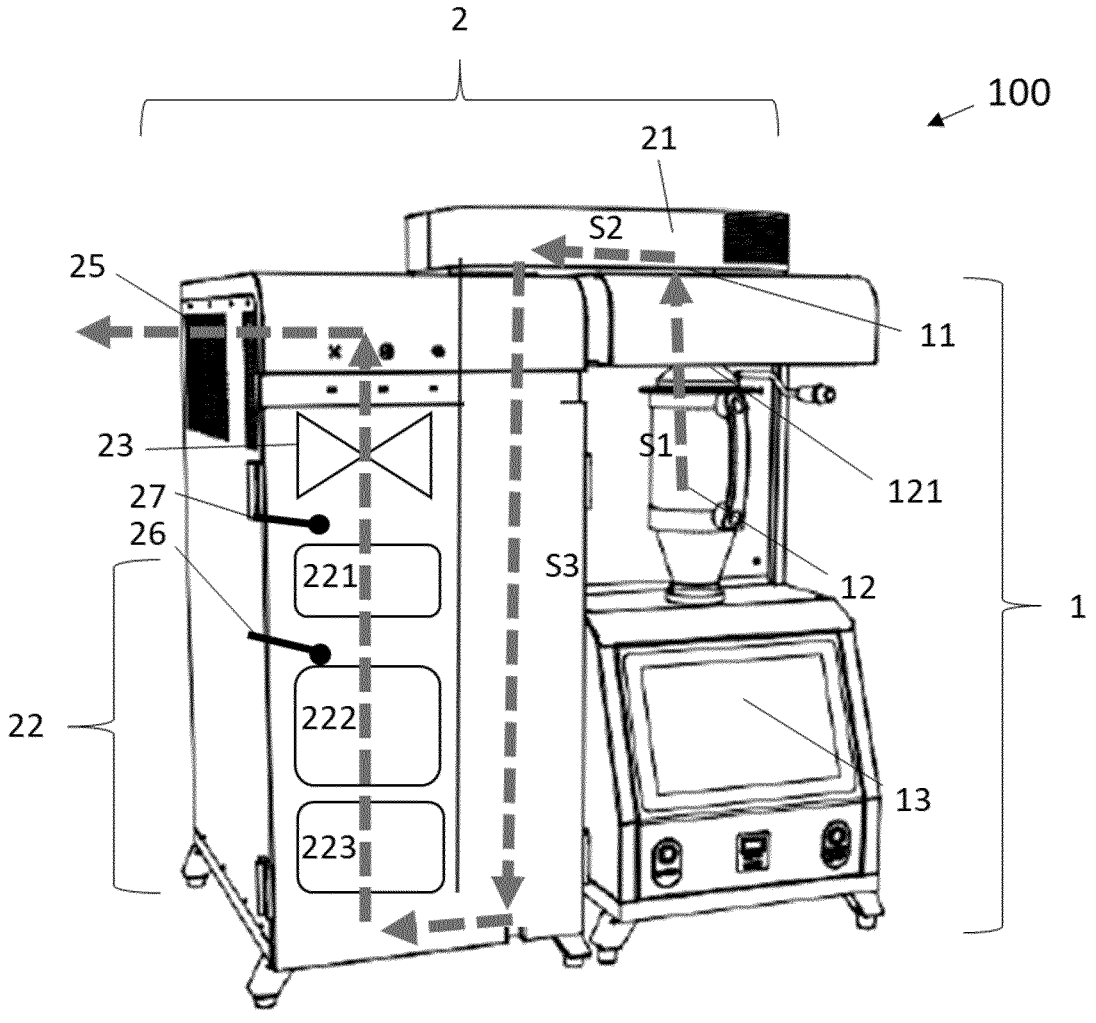
FIG. 1 is a view of a system according to the present invention illustrating the path of the smoke through the system, FIG. 2 a shows a block diagram of a control system of the system according to FIG. 1.

FIG. 1 shows an illustrative view of a system of a roasting apparatus 1 and a smoke treating unit 2. Functionally, the roasting apparatus is operable to roast coffee beans and the smoke treating unit is operable to treat the smoke generated during roasting by the roasting apparatus.

Roasting Apparatus

The roasting apparatus 1 is operable to receive and roast coffee beans inside a roasting chamber 12.

Preferably, the roasting apparatus 1 comprises a roasting chamber 12 in which a flow of hot air is introduced to agitate and heat the beans. The hot air flow is usually produced by an air flow driver and a heater. These devices are positioned below the roasting chamber and introduce the flow of hot air through the bottom of the chamber. In the illustrated figure, the bottom of the chamber is configured to enable air to pass through, specifically it can be a perforated plate on which the beans can lie and through which air can flow upwardly.

The air flow driver is operable to generate a flow of air upwardly in direction of the bottom of the vessel. The generated flow is configured to heat the beans and to agitate and lift the beans. As a result, the beans are homogenously heated. Specifically, the air flow driver can be a fan powered by a motor. Air inlets can be provided inside the base of the housing in order to feed air inside the housing, the air flow driver blowing this air in direction of the chamber 12.

The heater is operable to heat the flow of air generated by the air flow driver. Preferably, the heater is an electrical resistance positioned between the fan and the perforated plate with the result that the flow of air is heated before it enters the chamber 12 to heat and to lift the beans.

The heater and/or the fan are operable to apply a roasting profile to the beans, this roasting profile being defined as a curve of temperature against time.

Preferably, the roasting apparatus comprises a user interface 13 enabling:

the input of information about the roasting, in particular the quantity of beans introduced inside the roasting chamber and the desired level of roasting, and the output of information about the roasting operation (status, temperature, time) and preferably about the output of information about the smoke treating unit 2 in particular about the cleaning of the different filtering devices.

The roasting of the beans generates a smoke that is driven to the top opening 121 of the roasting chamber due to the flow of air generated by the air flow driver and as illustrated by arrow S1 in FIG. 1.

Generally a chaff collector is in flow communication with the top opening 121 of the chamber to receive chaffs that have progressively separated from the beans during roasting and due to their light density are blown off to the chaff collector.

The rest of the smoke is evacuated through the smoke outlet 11 at the top of the roasting apparatus.

Smoke Treating Unit

The smoke treating unit 2 is operable to receive and treat the smoke S1 emitted at the smoke outlet 11 of the roasting apparatus.

First, the smoke treating unit 2 comprises a smoke collecting device 21 adapted to collect the smoke. This smoke collecting device 21 or collecting device forms an internal void space or duct guiding the smoke (dotted lines S1, S2, S3) from the outlet 11 of the roasting apparatus in direction of the filtering devices of the smoke filtering sub-unit 22.

During roasting operations, big particles and greasy deposits are retained on the internal walls of the smoke collecting device 21. Big particles and greasy deposits are retained due to: difference of temperature (condensation on the walls), impaction, shape of the conduct (big particles being too heavy to follow the flow of smoke or sticking to the greasy walls). As a result, this smoke collecting device 21 must be frequently cleaned to avoid non desired odours, risk of fire and generation of more smoke This cleaning of the smoke collecting device 21 is not time consuming, because the smoke inlet can be rapidly dismounted and washed with hot water and detergent and replaced inside the smoke treating unit, but is recommended. If cleaning is not operated, the smoke collecting device can become obstructed after some time and can perturb the functioning of the roasting apparatus and the smoke treating unit (due to a drop in pressure).

The smoke filtering sub-unit 22 comprises an active carbon filter 221 adapted to remove VOCs from the smoke.

In addition, in the particularly illustrated embodiment, the smoke filtering sub-unit 22 comprises filters for particulate matter such as:

a device 223 adapted for filtering large particulate matter like PM10, for example a metallic mesh and an associated diffuser, generally a metallic grid positioned in front (that is upstream) of the mesh.

a device 222 adapted for filtering small particulate matter PM1, PM2.5 and PM10 (for example an electrostatic precipitator). Preferably, the device for removing particulate matter are positioned upstream the active carbon filter. This upstream position guarantees that particulate matter do not foul the active carbon filter.

Physically, the electrostatic precipitator is positioned below the active carbon filter to avoid that particulates fall from the electrostatic precipitator on the active carbon filter when the electrostatic precipitator is switched off.

When the maximal amount of VOCs retained by the active carbon filter 221 is reached, this active carbon filter is removed and replaced by a new one (generally a porous bag holding the active material and positioned in a box enabling smoke to pass through the bag). In view of the cost for such a filter, it is important to be sure it has reached its maximum amount of retained VOCs before replacing it.

The procedure is the same for an HEPA filter.

For the electrostatic precipitator 222, the cleaning operation consists in removing the cells of the electrostatic precipitator from the filter device and washing them with water and optionally with a detergent for example in a dishwasher. Then cleaning takes a certain time. With the recent trend to use small roasters in shops, restaurants and coffees, roasting operations can happen frequently during the opening hours and the need for cleaning the smoke filter device can happen urgently during the opening hours. In that case, the length of the cleaning becomes incompatible with the high rate of use of the roaster and the filter device. It is preferable to anticipate the cleaning operation.

The procedure is the same for the metallic mesh and the associated diffuser.

The smoke filtering sub-unit 22 comprises a smoke driver 23, generally a fan, for sucking the contaminated smoke from the inlet 211 of the collecting device through the smoke filtering sub-unit 22, where it is treated, to the outlet 25 of the smoke filtering sub-unit 22, where it is dispensed in ambient atmosphere safely.

Figure 2:
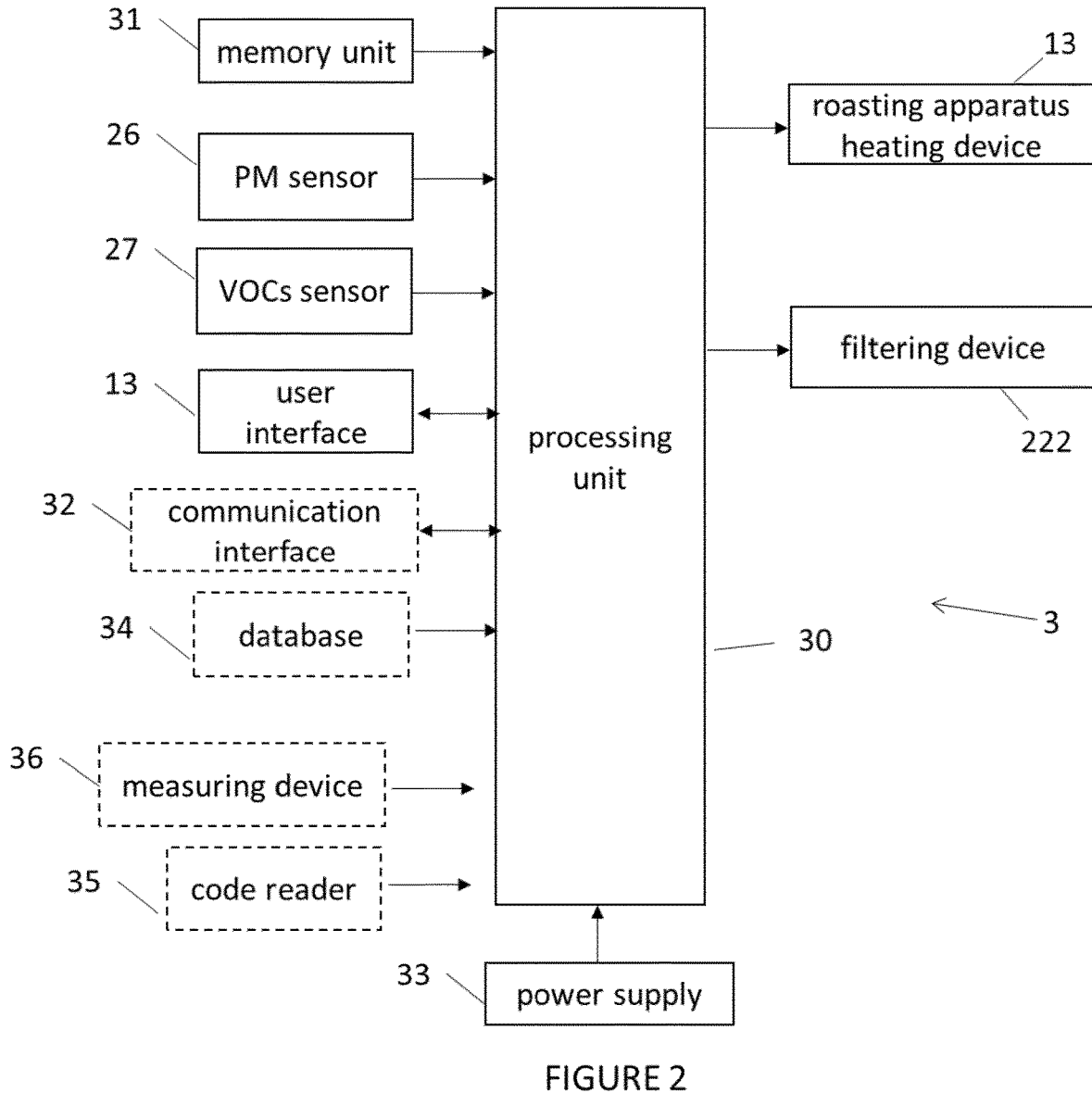

Control System of the system of the roasting apparatus and the smoke treating unit With reference to FIGS. 1 and 2, the control system 80 will now be considered: the control system 80 is operable to control the components of the system to roast coffee beans and in addition to monitor dirtiness of the smoke treating unit according to the roasting operations. Different integrations of the roasting apparatus and the smoke filtering unit can be implemented:

if the smoke treating unit is part of the roasting apparatus, usually the processing unit of the roasting apparatus is the master and the processing unit of the filter is the slave.

if the roasting apparatus and the smoke treating unit form two different apparatuses, each of them with its own processing unit, then these processing units can be configured to communicate to implement the method.

FIG. 2 illustrates the control system of the roasting apparatus of FIG. 1.

The control system 3 typically comprises at a second level of roasting apparatus: the user interface 13, a processing unit 30, a power supply 33, a memory unit 31, optionally a database 34 optionally sensors 26, 27, optionally a communication interface 32 for remote connection, optionally a code reader 35, optionally a measuring device 36.

The user interface 13 comprises hardware to enable a user to interface with the processing unit 30, by means of user interface signal.

More particularly, the user interface receives commands from a user, the user interface signal transfers the said commands to the processing unit 30 as an input. The commands may, for example, be an instruction to execute a roasting process and/or to adjust an operational parameter of the roasting apparatus 10 and/or to power on or off the roasting apparatus 10.

The processing unit 8 may also output feedback to the user interface 6 as part of the roasting process, e.g. to indicate the roasting process has been initiated or that a parameter associated with the process has been selected or to indicate the evolution of a parameter during the process or to create an alarm.

In particular, the user interface can be used:

to provide the quantity of the coffee beans introduced inside the chamber by manual input.

In an alternative embodiment, only one pre-determined quantity of beans can be roasted and this input is not necessary. The quantity can be obtained indirectly because pre-set.

optionally to provide the type of the coffee beans intro-
        duced inside the chamber by the user by manual input
        such as selection of an identification type in a list of
        pre-selected coffee beans or by entering a digital ref-
        erence of the coffee, for example read from a coffee
        beans package or a user's manual.
    to provide the desired level of roasting of these beans, by
        manual input such as selection in a list of levels like:
        light, medium, dark.

The processing unit 8 may also output feedback to the user interface 6 related to the treatment of the smoke by smoke treating unit 3, e.g. to indicate the treatment of the smoke is effective or to create an alarm.

In particular, the user interface can be used to display:
    the status of dirtiness of the smoke treating unit,
    the number of roasting operations still able to be imple-
        mented before cleaning the filtering devices of the
        smoke treating unit,
    an alert for unexpected high level of emissions,
    cleaning instructions,
    reset of the counters.

The hardware of the user interface may comprise any suitable device(s), for example, the hardware comprises one or more of the following: buttons, such as a joystick button, knob or press button, joystick, LEDs, graphic or character LDCs, graphical screen with touch sensing and/or screen edge buttons. The user interface 20 can be formed as one unit or a plurality of discrete units.

A part of the user interface can also be on a mobile app when the apparatus is provided with a communication interface 32 as described below. In that case at least a part of input and output can be transmitted to the mobile device through the communication interface 32.

The sensors 26, 27 are operable to provide an input signal to the processing unit 30 for monitoring of the process of filtering the emissions produced during the roasting of beans. The input signal can be an analogue or digital signal. The sensors 26, 27 typically comprise at least one PM sensor and/or VOCs sensor.

A code reader 35 can be provided and operable to read a code, for example on coffee beans package, and automati-cally provide an input that is the identification of the type of coffee beans introduced in the chamber 1 and optionally operation conditions for roasting a specific quantity of said coffee beans.

A measuring device 35 can be provided to measure the quantity of beans introduced in the chamber and, in the step of supplying the control system with the quantity of coffee beans, said quantity of coffee beans can be automatically measured by the measuring device and supplied to the control system of the apparatus.

In another embodiment, a level sensor (not illustrated) can be provided to measure the level of coffee beans introduced inside the chamber, and in the step of supplying the control system with the quantity of coffee beans, said quantity of coffee beans can be automatically measured by the level sensor and supplied to the control system of the apparatus.

In another embodiment, where the roasting apparatus is configured to roast one pre-determined quantity of beans only, said pre-determined quantity of beans can be stored in a package and the package can be fully emptied in the roasting chamber. The quantity can be part of the data stored in the memory 31 of the processing unit as mentioned below.

The processing unit 30 generally comprises memory, input and output system components arranged as an inte-grated circuit, typically as a microprocessor or a microcon-troller. The processing unit 8 may comprise other suitable integrated circuits, such as: an ASIC, a programmable logic device such as a PAL, CPLD, FPGA, PSoC, a system on a chip (SoC), an analogue integrated circuit, such as a con-troller. For such devices, where appropriate, the aforemen-tioned program code can be considered programmed logic or to additionally comprise programmed logic. The processing unit 30 may also comprise one or more of the aforemen-tioned integrated circuits. An example of the later is several integrated circuits arranged in communication with each other in a modular fashion e.g.: a slave integrated circuit to control the smoke treating unit 2 in communication with a master integrated circuit to control the roasting apparatus 10, a slave integrated circuit to control the user interface 13 in communication with a master integrated circuit to control the roasting apparatus 10

The control system 80 can comprise a communication interface 32 for data communication of the roasting appa-ratus 10 with another device and/or system, such as a server system, a mobile device. The communication interface 32 can be used to supply and/or receive information related to the coffee beans roasting process, such as roasting process information, type of the beans, quantity of beans. The communication interface 32 may comprise first and second communication interface for data communication with sev-eral devices at once or communication via different media.

The communication interface 32 can be configured for cabled media or wireless media or a combination thereof, e.g.: a wired connection, such as RS-232, USB, I2C, Eth-ernet define by IEEE 802.3, a wireless connection, such as wireless LAN (e.g. IEEE 802.11) or near field communica-tion (NFC) or a cellular system such as GPRS or GSM. The communication interface 32 interfaces with the processing unit 30, by means of a communication interface signal. Generally the communication interface comprises a separate processing unit (examples of which are provided above) to control communication hardware (e.g. an antenna) to inter-face with the master processing unit 30. However, less complex configurations can be used e.g. a simple wired connection for serial communication directly with the pro-cessing unit 30.

The power supply 33 is operable to supply electrical energy to the said controlled components and the processing unit 30. The power 33 may comprise various means, such as a battery or a unit to receive and condition a main electrical supply. The power supply 33 may be operatively linked to part of the user interface 13 for powering on or off the roasting apparatus 1 and/or the smoke treating unit 2.

The processing unit 30 generally comprises a memory unit 31 for storage of instructions as program code and optionally data. To this end the memory unit typically comprises: a non-volatile memory e.g. EPROM, EEPROM or Flash for the storage of program code and operating parameters as instructions, volatile memory (RAM) for temporary data storage. The memory unit may comprise separate and/or integrated (e.g. on a die of the semiconduc-tor) memory. For programmable logic devices the instruc-tions can be stored as programmed logic.

The instructions stored on the memory unit 31 can be idealised as comprising a program to determine the level of dirtiness of the smoke treating unit of the system and in particular the number of roasting operations still able to be implemented before a cleaning operation is necessary.

During a roasting operation, the control system 3 is operable:

to obtain directly or indirectly the quantity of beans roasted during said roasting operation and the level of roasting applied to the beans during said roasting operation, based on said obtained quantity of beans roasted and on said obtained level of roasting, to determine the amount of particular matters or VOCs retained in the filtering device of the smoke treating unit during said roasting operation, to determine the global amount of PM or VOCs retained in the filtering device during all the roasting operations implemented since the last cleaning operation of the filtering device, to determine the number of roasting operations still able to be implemented before said global amount is equal to the maximal amount of particulate matters or VOCs able to be retained by the filtering device.

These steps of operations can be implemented separately for each of the different filtering devices part of the smoke treating unit in order to determine the level of dirtiness of each of these filtering devices. For example, for the smoke treating unit 2 illustrated in FIG. 1, these steps can be repeated separately for each of the following devices:

the metallic filter and the diffuser 223, and the electrostatic precipitator 222, and the active carbon filter 221.

In addition and in a similar way, these steps of operation can be implemented to determine the level of dirtiness of the smoke collecting device 21.

For each roasting operation, the first step can be common for all the filtering devices, that is the obtention of quantity, level and optionally type of the beans.

In one first embodiment, the quantity of beans roasted and the level of roasting applied to the beans during the roasting operation can be provided by the operator through the user interface 13 of the roasting apparatus. Actually, these pieces of information (quantity, level, optionally type of beans) are usually inputted in the user interface of the roasting apparatus when the operator defines the roasting operation. These pieces of information enable the implementation of roasting parameters specifically adapted to the beans and guaranteeing an optimal roasting.

The quantity of coffee beans can also be automatically provided from a measuring device 36 or a level sensor.

In a specific embodiment, the quantity can be predetermined and stored in the memory 31 or taken into account in an instruction of the programme.

The type of beans can also be automatically provided from a code reader 35 as mentioned above.

Then, for each of the filtering device comprised in the smoke treating unit, the following steps can be implemented.

Based on the pieces of information (quantity, level and optionally type) obtained at the first common step, the processing unit 30 is operable to determine the amount of particular matters or VOCs that is going to be retained in one specific filtering device during the roasting operation.

The retained amount is determined from:

the knowledge of the specific amounts of PM and/or VOCs produced by a specific quantity of beans roasted to a specific level, optionally produced by a specific quantity of type of beans roasted to a specific level. These specific amounts are pre-determined by experimentation as mentioned above. These amounts are generally specific to the type of roasting apparatus. If a blend of different types of beans is used, then to determine the amounts, it is considered that the whole blend is made of the beans that produce the highest level of emissions.

the hypothesis that the specific filtering device retains 100% of the PM or the VOCs it is configured to retain or the knowledge of the efficiency of the specific filtering device to retain a certain percentage of PM or VOCs (e.g. 98%). This percentage are pre-determined by experimentation or correspond to specification provided by manufacturers of filtering devices.

For the smoke collecting device 21, the amount of residues trapped inside during a roasting operation based on the obtained quantity of beans roasted and on the obtained level of roasting is determined by experimentation too.

For example, two endurance tests can be operated either with roasting operations at light level only or with roasting operations at dark level only till there is need of cleaning. In both cases, the same specific quantity of beans is used. The need for cleaning can be controlled through various controls:

dismantling the smoke collecting device and controlling the fouling visually, and/or measuring a pressure drop, and/or visually observing a backflow at the roaster chamber outlet ?These tests provide the number of roasting operations that can be operated at dark level or at light level before cleaning is necessary.

The number of operations for a medium roasting level can be extrapolated from these two numbers.

These amounts can be stored in the memory 31 of the processing unit 30. Alternatively, these data can be stored in a remote server and the processing unit 30 can be supplied with access to this remote server through the communication interface 32, directly or indirectly through a mobile device establishing connection between the remote server and the processing unit.

The control system 3 can comprise a database 34 storing information about coffee beans, in particular about the operation conditions for roasting specific coffee beans as described hereunder. The database 34 can be stored locally in the memory 31 of the control system of the roasting apparatus or remotely in a server accessible through the communication interface 32 or in the 31 of the control system of the smoke filtering unit.

In one alternative embodiment, the control system can be provided with these predefined amounts during a code reading operation, these pieces of information being encoded inside the code and decoded by the control system or the code providing a reference that enables the retrieval of the pieces of information from the memory 31 of the control system in the memory 31 or remotely in a server.

Generally, the method comprises a step of getting access, for each smoke treating unit, to the performance of reduction of the level of each contaminant by said smoke treating unit. These performances can be stored in a memory of the device on which the method is implemented or in a remote server accessible by said device. These performances can form an accessible database.

Based on the amount retained during this roasting operation, the processing unit 30 is operable to determine the global amount of PM or VOCs retained in the filtering device during all the roasting operations implemented since the last cleaning operation of the filtering device. The new determined global retained amount is simply added to all the previous determined retained amounts since the last cleaning operation.

Finally, the processing unit 30 is operable to determine the number of roasting operations still able to be implemented before the new global retained amount is equal to the pre-determined maximal amount of particulate matters or VOCs able to be retained by the filtering device.

The number of roasting operations still implementable can be estimated in terms of a number of repetition of one particular pre-defined type of roasting operation (operation by default). This particular roasting operation is pre-defined in terms of quantity of beans, level of roasting and optionally type of beans. Accordingly, the amounts of VOCs and/or PM per such pre-defined roasting operation can be pre-determined. Once the global amount of PM or VOCs retained in the filtering device is known, the difference with the pre-determined maximal amount of particulate matters or VOCs able to be retained by the filtering device, enables the calculation of the number of identical particular pre-defined type of roasting operation still possible to implement.

This particular pre-defined type of roasting operation can correspond to the preferred roasting operation implemented with the roasting apparatus, for example the most frequently operated, or it can correspond to the average parameters of the parameters of the roasting operations implemented with the roasting apparatus on a particular period of time. It can also correspond to a roasting operation set to produce the lower level of PMs and VOCs as possible (such as roasting an average quantity at light level of roasting) or a roasting operation set to produce the highest level of PMs and VOCs as possible (such a roasting an average quantity at dark level of roasting). The operator might be able to choose this particular pre-defined type of roasting operation in a configuration step of the system or the configuration can be pre-set at the manufacturing plant.

Alternatively, can be presented by providing the quantity of coffee that can still be roasted according to a typical roasting operation.

Optionally, the estimation of the number of roasting operations still implementable can be balanced by applying a coefficient of margin or error to avoid any risk of under-estimation and that the filtering device is cleaned or replaced too late. This coefficient can be the same for all the filtering devices or one specific coefficient can be applied for each specific filtering device.

For example, in the method of roasting with a roasting apparatus comprising an electrostatic precipitator, it can be pre-determined that:
the maximal amount of particulate matters PM 2.5 that can be retained before a cleaning operation is necessary is A grams (g) PM 2.5.
the amount of particulate matters PM 2.5 emitted during the roasting of 250 g of coffee beans can be of $a_1$ g, $a_2$ g and $a_3$ g respectively for a light, a medium or dark level respectively.

When a roasting operation is implemented, the quantity of beans and the level of roasting are defined and enable the determination of the amount of particulate matters PM 2.5 that are emitted during the roasting operation. For example, for 500 g of beans roasted at medium level, the amount of PM 2.5 is going to be $2 \times a_2$ g.

At the end of the operation, this amount of $2a_2$ g of PM 2.5 will be retained inside the electrostatic precipitator.

At each roasting operation, the determined amounts are added one to the other to determine the global amount of PM 2.5 retained in the electrostatic precipitator.

The number of roasting operations still able to be implemented before the electrostatic precipitator needs a cleaning operation can be estimated from the difference between the global amount of PM 2.5 retained and the maximal amount of PM 2.5.

If the roasting operation defined by default is the roasting of 250 g of coffee beans to a light level, the corresponding amount of $a_1$ g of PM 2.5 emitted during such an operation enables the estimation of the number of such a roasting still possible. This estimated number can be displayed as such or can be converted in the number of kg of coffee beans roasted during these estimated operations.

Figure 3:
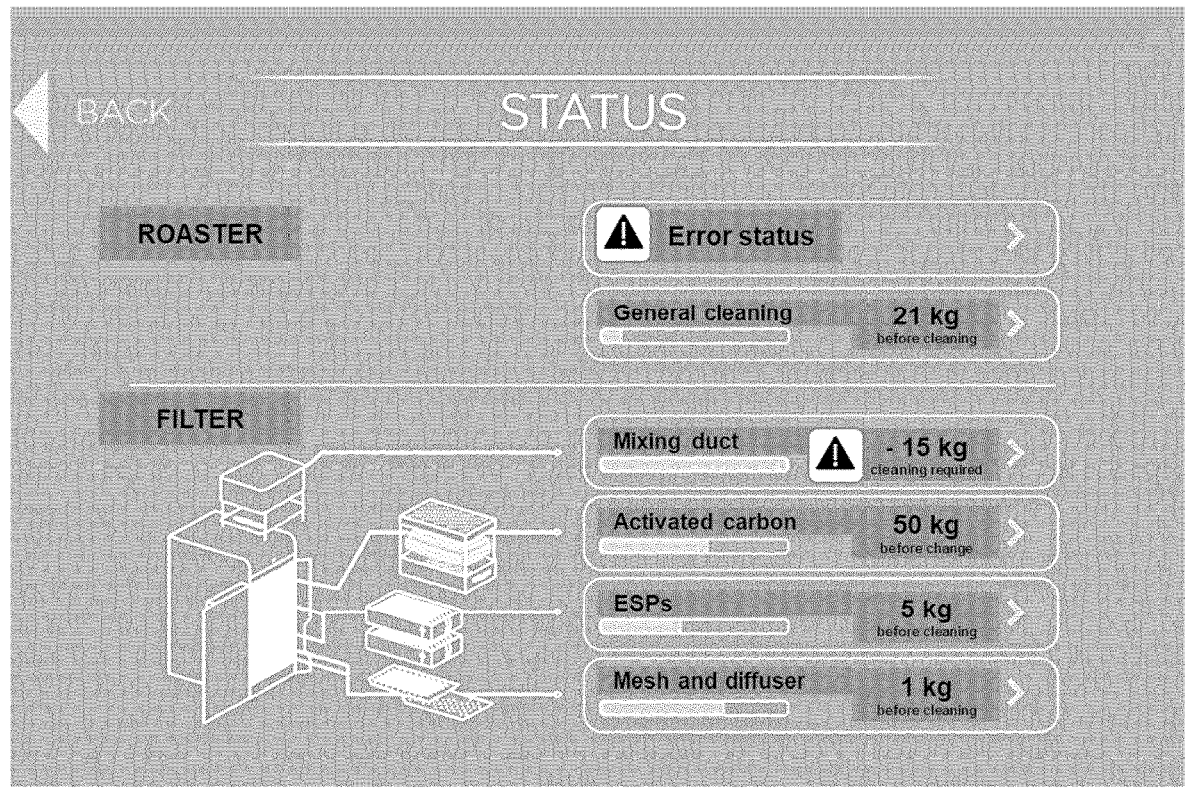
FIG. 3 is an illustration of the user interface of the system and type of information that can be displayed on it.

FIG. 3 illustrates the user interface 13 of the roasting apparatus displaying the number of roasting operations in kilograms of coffee beans that can still be implemented for each of the three filtering devices 221, 222, 223 and for the smoke collecting device 21 before it is required to clean or change said devices.

From the display, it appears that different quantities of coffee beans can be determined for the different filtering devices. This is due to the fact some filtering device needs more frequent cleaning due to their capacities for retaining emissions and the different quantities of the different types of emissions (VOCs, PMs, oils, . . . ) emitted during the different roasting operations.

According to information displayed on the user interface 13:
1 kg of coffee beans can still be roasted before the metallic mesh and the diffuser 223 are cleaned,
1 kg of coffee beans can still be roasted before the electrostatic precipitator 222 is cleaned,
50 kg of coffee beans can still be roasted before the active carbon bag 221 is replaced,
for the smoke collecting device 21, the alert for cleaning requirement has already appeared and 15 kg of beans have been roasted since this device is requiring cleaning.

One advantage of the method is to estimate the need for cleaning the different components of the smoke filtering unit in an accurate way.

Another advantage of the method is to estimate the need for cleaning each of the different components of the smoke filtering unit and alert the operator about the need of cleaning one component only without need to clean the other components.

Although the invention has been described with reference to the above illustrated embodiments, it will be appreciated that the invention as claimed is not limited in any way by these illustrated embodiments.

Variations and modifications may be made without departing from the scope of the invention as defined in the claims. Furthermore, where known equivalents exist to specific features, such equivalents are incorporated as if specifically referred in this specification.

As used in this specification, the words "comprises", "comprising", and similar words, are not to be interpreted in an exclusive or exhaustive sense. In other words, they are intended to mean "including, but not limited to".

LIST OF REFERENCES IN THE DRAWINGS roasting apparatus 1
  smoke outlet 11
  roasting chamber 12
    top outlet 121
  user interface 13
smoke treating unit 2
  smoke collecting device 21
  smoke filtering sub-unit 22
    active carbon filter 221
    electrostatic precipitator 222
    PM filter 223

21 smoke driver 23
outlet 25
PM sensor 26
VOC sensor 27
control system 3
processing unit 30
memory unit 31
communication interface 32
power supply 33
database 34
code reader 35
measuring device 36
system 100

The invention claimed is:

1. A method to roast coffee beans in a roasting system, said system comprising:

a roasting apparatus, and a smoke treating unit configured to treat the smoke produced by the roasting apparatus, said smoke treating unit comprising at least one filtering device configured for filtering particulate matters or VOCs, said filtering device being able to retain a pre-determined maximal amount of particulate matters or VOCs, wherein at each roasting operation implemented in the roasting apparatus, the method comprises the steps of:

obtaining directly or indirectly the quantity of beans roasted during said roasting operation and the level of roasting applied to the beans during said roasting operation, determining the amount of particulate matters or VOCs retained in said filtering device during said roasting operation based on said obtained quantity of beans roasted and on said obtained level of roasting, determining the global amount of particular matters or VOCs retained in said filtering device during all the roasting operations implemented since the last cleaning operation of the filtering device, and estimating the number of roasting operations still able to be implemented before said global amount is equal to the pre-determined maximal amount of particulate matters or VOCs able to be retained by the filtering device.

2. A method according to claim 1, wherein the smoke treating unit comprises at least one filtering device selected from the group consisting of: a high efficiency particulate accumulator filter, a metallic filter, an electrostatic precipitator, and an active carbon filter.

3. A method according to claim 1, wherein said method comprises the steps of:

obtaining the type of beans roasted during said roasting operation, determining the amount of particular matters or VOCs in the filtering device during the roasting operation based on the obtained quantity of said type of beans roasted and on the obtained level of roasting of said type of beans.

4. A method according to claim 1, wherein the number of roasting operations still able to be implemented is estimated based on:

the pre-determined maximal amount of particulate matters or VOCs able to be retained by the filtering device, and a specific type of roasting operation, said type of roasting operation being defined by a specific quantity of beans roasted during said roasting operation and a specific level of roasting applied to the beans during said roasting operation.

5. A method according to claim 1, wherein said specific type of roasting operation is defined from the past roasting operations implemented within the roasting apparatus.

6. A method according to claim 1, wherein the roasting apparatus is configured to enable the input of the quantity of beans roasted during said roasting operation and/or the level of roasting applied to the beans during said roasting operation.

7. A method according to claim 1, wherein:

the smoke treating unit comprises a particulate matter sensor or a VOCs sensor positioned downstream the roasting apparatus, and at each roasting operation implemented in the roasting apparatus, the quantity of beans roasted during said roasting operation and the level of roasting applied to the beans during said roasting operation are obtained from the quantity of particulate matter or VOCs measured by said sensor.

8. A method according to claim 1, wherein the smoke treating unit comprises:

an electrostatic precipitator and a sensor for measuring PM, said PM sensor being positioned downstream said electrostatic precipitator, and an active carbon filter and a sensor for VOCs, said VOCs sensor being positioned just downstream said active carbon filter.

9. A method according to claim 7 wherein:

at each roasting operation implemented in the roasting apparatus, the quantity of beans roasted during said roasting operation and the level of roasting applied to the beans during said roasting operation are obtained:

from the quantity of particulate matter or VOCs measured by said sensor downstream the roasting apparatus, and from the input of the quantity of beans roasted during said roasting operation and/or the level of roasting applied to the beans during said roasting operation.

10. A method according to claim 1, wherein the smoke treating unit comprises multiple filtering devices and said method is applied for each filtering device of the smoke treating unit.

11. A method according to claim 1, wherein the roasting apparatus comprises a display unit and the method comprises the step of displaying the estimated number of roasting operations still able to be implemented before the global amount is equal to the pre-determined maximal amount of particulate matters or VOCs able to be retained by the filtering device.

12. A method according to claim 1, wherein the smoke treating unit comprises a cleanable smoke collecting device configured to collect smoke from the outlet of the roasting apparatus wherein at each roasting operation implemented in the roasting apparatus, the method comprises the steps of:

determining the amount of residues trapped in said smoke collecting device during said roasting operation based on said obtained quantity of beans roasted and on said obtained level of roasting, determining the global amount of residues trapped in said smoke collecting device during all the roasting operations implemented since the last cleaning operation of the smoke collecting device, and estimating the number of roasting operations still able to be implemented before said global amount is equal to a pre-determined maximal amount of residues able to be deposited in the smoke collecting device.

13. A system for roasting coffee beans in a room, said system comprising:

a roasting apparatus, and a smoke treating unit configured to treat the smoke produced by the roasting apparatus, said smoke treating unit comprising at least one filtering device configured for filtering particulate matters or VOCs, said filtering device being able to filter a pre-determined maximal amount of particulate matters or VOCs before being cleaned, a control system configured to control the roasting process by:

wherein at each roasting operation implemented in the roasting apparatus, the method comprises the steps of:

obtaining directly or indirectly the quantity of beans roasted during said roasting operation and the level of roasting applied to the beans during said roasting operation, determining the amount of particulate matters or VOCs retained in said filtering device during said roasting operation based on said obtained quantity of beans roasted and on said obtained level of roasting, determining the global amount of particular matters or VOCs retained in said filtering device during all the roasting operations implemented since the last cleaning operation of the filtering device, and estimating the number of roasting operations still able to be implemented before said global amount is equal to the pre-determined maximal amount of particulate matters or VOCs able to be retained by the filtering device.

14. A method according to claim 5, wherein said specific type of roasting operation is defined from the past roasting operations implemented within the roasting apparatus through machine learning or through statistics.

\* \* \* \* \*